United States Patent
Malz et al.

(10) Patent No.: US 7,579,393 B2
(45) Date of Patent: Aug. 25, 2009

(54) MIXTURES CONTAINING POLYTETRAHYDROFURAN AND A STABILISER

(75) Inventors: Hauke Malz, Diepholz (DE); Dieter Rodewald, Ludwigshafen (DE); Hermann Graf, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 207 days.

(21) Appl. No.: 10/584,767

(22) PCT Filed: Dec. 30, 2004

(86) PCT No.: PCT/EP2004/014827

§ 371 (c)(1),
(2), (4) Date: Jun. 28, 2006

(87) PCT Pub. No.: WO2005/068545

PCT Pub. Date: Jul. 28, 2005

(65) Prior Publication Data

US 2007/0129487 A1 Jun. 7, 2007

(30) Foreign Application Priority Data

Jan. 14, 2004 (DE) .................. 10 2004 002 094

(51) Int. Cl.
*C09K 3/00* (2006.01)
*C08G 18/08* (2006.01)
*C08G 18/32* (2006.01)

(52) U.S. Cl. .............. 524/113; 524/291; 524/589; 252/182.19; 252/182.24; 528/48; 528/85

(58) Field of Classification Search .......... 524/113, 524/291, 589; 528/48, 85; 252/182.19, 182.24
See application file for complete search history.

(56) References Cited

FOREIGN PATENT DOCUMENTS

WO 02/02684 1/2002

OTHER PUBLICATIONS

Hanser, "Plastics additives Handbook", Antioxidants, pp. 98-107, 5th Ed. (2001).

*Primary Examiner*—Kriellion A Sanders
(74) *Attorney, Agent, or Firm*—Oblon, Spivak, McClelland, Maier & Neustadt, P.C.

(57) ABSTRACT

The invention relates to mixtures (1) comprising (a) polytetrahydrofuran and (b) stabilizers having a molecular weight of from 600 g/mol to 10000 g/mol and comprising at least two phenolic groups.

10 Claims, No Drawings

MIXTURES CONTAINING POLYTETRAHYDROFURAN AND A STABILISER

The invention relates to mixtures (1) comprising (a) Polytetrahydrofuran and (b) preferably amorphous or liquid stabilizers having a molecular weight of from 600 g/mol to 10000 g/mol, preferably from 700 g/mol to 3000 g/mol, and comprising at least two phenolic groups. In addition, the invention relates to mixtures (1) comprising (a) polytetrahydrofuran and (b) stabilizers comprising at least two phenolic groups which are joined to one another by a polyol having a number average molecular weight of from 40×F g/mol to 1000×F g/mol, preferably from 75×F g/mol to 500×F g/mol, in particular from 90×F g/mol to 150×F g/mol, where F is the number of the phenolic groups in the molecule, as connecting radical (II). Furthermore, the invention relates to a process for producing polyurethanes in which these mixtures are used as polyol component.

Polytetrahydrofuran, also referred to as PTHF and commercially available under the trade name PolyTHF® (BASF Aktiengesellschaft), the oligmer or polymer of tetrahydrofuran, is used as preferred soft segment in various elastomeric polymers such as thermoplastic polyurethanes, casting elastomers based on urethane/urea, polyether esters or polyetheramides and also elastic fibers (Elasthan, Spandex). A large part goes into the fiber sector for producing elastic fibers for use in the garment sector, e.g. swimsuits or stockings. Customary Spandex fibers comprise about 80% of PTHF. PolyTHF® is also a popular soft segment in, for example, TPU or polyester applications because of the high elasticity and cold flexibility which can be achieved.

However, polyetherols such as PolyTHF® have only limited stability under oxidative and thermal stress, since the hydrogen atom in the α-position relative to the oxygen of the polymer chain can easily be abstracted. The peroxy radical formed in the subsequent reaction with oxygen radicals leads in turn to renewed extraction of a hydrogen radical. This results in a cycle which can lead to rapid degradation of the entire polyetherols. For this reason, it is prior art to add antioxidants to prolong the life of PTHF and PTHF-comprising polymers. Examples of such stabilizers are the class of sterically hindered phenols. Stabilizers of this class are wide spread and examples may be found, inter alia, in "Plastics Additive Handbook", Hans Zweifel, $5^{th}$ edition, 2001, Hanser Verlag, Munic, on pages 98-107.

However, not all phenolic stabilizers are equally suitable for stabilizing PTHF. Thus, the stabilizers have to be readily soluble in the PTHF and in the finished product. The first property is absolutely necessary for good incorporation into the PTHF, while the later property is indispensable for preventing efflorescence of the stabilizer from the finished product. For the purposes of the present invention, efflorescence is the formation of crystalline deposits of stabilizer on the surface of the workpiece. Such deposits always lead to customer objections or complaints. At present, butylated hydroxytoluene (BHT) is preferably used for stabilizing PTHF. This stabilizer is inexpensive and has a relatively good solubility PTHF and the polymers produced therefrom. However, BHT has a very low molar mass. This leads to fogging problems. For the purposes of the present invention, fogging is the deposition of a constituent which has volatilized from the workpiece on a surface, e.g. a wind shield of an automobile. Fogging is one of the most important problems associated with the use of plastics in automobile construction.

It was thus an object of the invention to find a stabilizer for PTHF which is readily soluble in the PTHF and in the downstream products and, owing to its low volatility, does not lead to fogging problems.

The object of the invention has been able to be achieved by preferably amorphous or liquid stabilizers comprising at least two phenolic groups which are joined to one another by a polyol having a number average molecular weight of from 40×F g/mol to 1000×F g/mol, preferably from 75×F g/mol to 500×F g/mol, in particular from 90×F g/mol to 150×F g/mol, where F is the number of the phenolic groups in the molecule, as connecting radical (II). The molecular weight range is thus calculated by multiplying the number of the phenolic groups by the appropriate factor, for example by 40 and 1000. When two phenolic groups are present (F=2), the molecular weight range is thus from 80 to 2000 g/mol. The connection radical (II) which is preferred according to the invention thus preferably has a number average molecular weight of from 40×F g/mol to 1000×F g/mol, preferably from 75×F g/mol to 500×F g/mol, in particular from 90×F g/mol to 150×F g/mol, where F is the number of phenolic groups as active groups (I). This molecular weight relates to (II). Preference is given to stabilizers in which F=2, i.e. stabilizers which have two phenolic groups. The stabilizers used according to the invention are generally known from WO 02/002684.

The stabilizers thus preferably comprise two structural units, viz. firstly at least two phenolic groups as active groups (I) which are joined to one another via a compatibilizing polyol which has the effect of making the stabilizer amorphous, for example a polyether, polyester, polycarbonate diol, polythioether and/or polyether-polythioether. The polyether, polyester, polycarbonate diol, polythioether and/or polyether-polythioether represents the connecting radical (II). The connection between the phenolic groups (I) to the connecting radical (II) can be established, for example, via ester groups, amide groups and/or thioester groups, preferably ester groups. For example, the stabilizers used according to the invention can be prepared by generally known esterification and/or amidation of active compounds which have at least one phenolic group and at least one carboxyl group by means of polyethers, polycarbonate diols, polyesters, polythioethers and/or polyether polythioethers, which have at least two free groups which are reactive to carboxyl groups, for example hydroxyl groups and/or amino groups. It has surprisingly been found that the color of the stabilizers is particularly good when a reducing agent, preferably a phosphorus compound, in particular a compound of trivalent phosphorus is present in synthesis. Examples of suitable phosphorus compounds may be found in Plastics Additive Handbook, $5^{th}$ edition, H. Zweifel, ed, Hanser Publishers, Munich, 2001 ([1]), pp. 109-112.

An example of a group which may be present as active group (I) is:

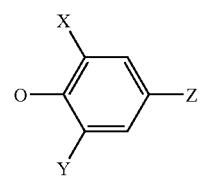

where

X, Y are each, independently of one another, hydrogen, straight-chain, branched or cyclic alkyl groups from 1 to 12 carbon atoms.

Z is at least one carboxyl group compounded to the phenol radical via an alkylene radical.

Preference is given to using the following compounds as starting groups,

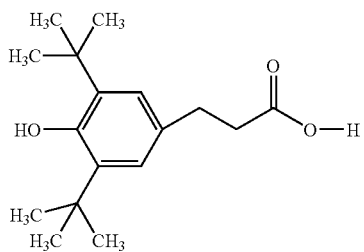

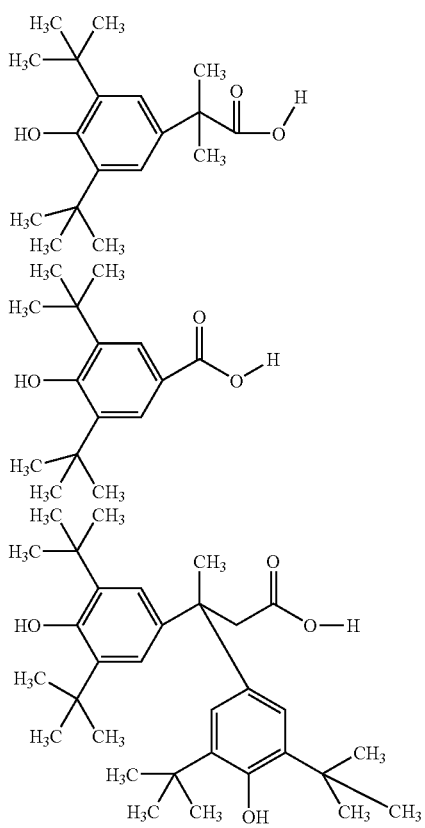

A particularly preferred group (I) is the following compound:

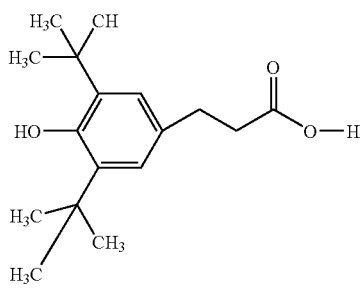

To join the radical (I) to the connecting radical (II), the radical (I) can be used as anhydride, acid chloride, ester or free acid. The radical "R" or "Z" varies correspondingly in the above formulae. These phenolic groups (I) are, according to the invention, joined to one another by a connecting radical (II) via the carboxyl group of (I).

As a result of the preferred molecular weight of (II), the mass ratio of compatibilizing radical (II) to the active group (I) is optimized. In determining the molecular weight of (II), the nitrogen or oxygen atom via which (II) in the amide or ester form is bound to (I) is, if appropriate, included.

Preference is thus given to stabilizers (b), also referred to as antioxidants in the present text, in which the phenolic groups as active groups (I) are connected by a connecting radical (II). Preference is given to connecting radicals (II) in which the molar mass is not uniform, i.e. in which the number average molecular weight is less than the weight average molecular weight (Mn<Mw). This molecular weight distribution suppresses undesirable crystallization of the stabilizers.

As connecting radical (II), it is possible, for example, to use generally customary polyols, for example polyesters, polycarbonate diols, polyethers, polythioethers and/or polyether polythioethers, preferably polyethers, which have at least two groups which are reactive towards carboxyl groups, for example hydroxyl groups, thiol groups and/or amino groups, for example primary amino groups which can be reacted with carboxyl groups of (I) to produce the stabilizers used according to the invention. The connection radical (II) can be linear or branched.

For example, the stabilizers (b) can have the following general structure:

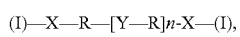

or, when the stabilizer has a functionality of >2,

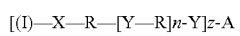

where (I) is the active group described at the outset which is bound via its carboxyl group, X is —O—, —S— or —NH—, preferably —O—

Y is —O— or —S—, preferably —O—

R is $C_2$-$C_{12}$-alkyl which may be linear or branched.

n is an integer by means of which the molecular weight according to the invention is achieved, A is a hydrocarbon skeleton having 3-20 carbon atoms, z is 3, 4, 5, 6, 7 or 8 and in the event of X, Y and R, occurring more than once in (II), they can in each case, independently of one another, have different meanings, e.g. X can be both sulfur and oxygen within one connecting radical (II). The definition of n applies to all the formulae occurring in the present text.

Preferred connecting radicals (II) are the following radicals:

polytetrahydrofuran having a number average molecular weight of from 200 g/mol to 300 g/mol, polyethylene glycol having a number average molecular weight of from 150 g/mol to 300 g/mol.

In addition, it can be advantageous to mix various radicals (II) and react the mixture with (I) in order to obtain ideal viscosity, compatibility, solubility and efflorescence behavior of the resulting stabilizers.

Particular preference is given to mixtures (1) comprising the following phenolic stabilizer (b):

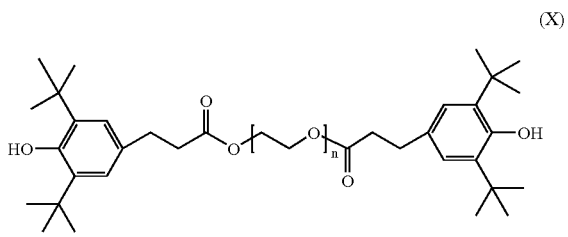

(X)

where n is an integer in the range from 1 to 31, preferably 2, 3, 4, 5, or 6, particularly preferably 3 or 4. In particular, n is selected so that the number average molecular weight of the stabilizer is from 700 g/mol to 800 g/mol. n is particularly preferably selected so that in the collective mixture, i.e. the stabilizer mixture comprising the individual stabilizer molecules, the weight average molecular weight of the stabilizer mixture is greater than the number average molecular weight of the stabilizer mixture.

Particular preference is given to the following phenolic stabilizer (b):

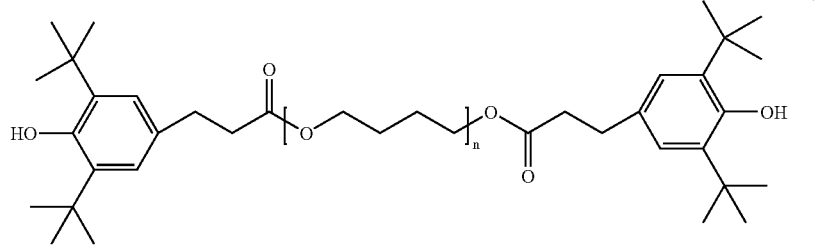

(XX)

where n is an integer in the range from 1 to 31, preferably 2, 3, 4, 5, or 6, particularly preferably 3 or 4. n is particularly preferably selected so that the number average molecular weight of the stabilizer is from 700 g/mol to 900 g/mol. n is particularly preferably selected so that in the collective mixture, i.e. the stabilizer mixture comprising the individual stabilizer molecules, the weight average molecular weight of the stabilizer mixture is greater than the number average molecular weight of the stabilizer mixture, i.e. the preferred antioxidants (X) and (XX) are particularly preferably used in mixtures of various compounds of the formulae (X) and/or (XX), which have different values of n. The proportion of molecules having n=1, n=2, n=3, etc. up to n=31 is preferably selected so that the number average molar mass of the antioxidant mixture corresponds to the molar mass recognized as advantageous. The proportion of molecules having n=1, n=2, n=3 to n=31 is preferably selected so that the number average molar mass of the antioxidant mixture i.e. the stabilizer (b) used according to the invention, is from 600 g/mol to 16000 g/mol, preferably from 700 g/mol to 10000 g/mol, particularly preferably from 700 g/mol to 3000 g/mol, in particular from 700 g/mol to 900 g/mol. In a further, preferred embodiment, the antioxidant mixtures whose polydispersity Pd is greater than 1, i.e. their number average molar mass is less than their weight average molar mass, are used. This criterion is met when, for example, the antioxidant comprises a mixture of various molecules of the structure (X) or (XX) having different values of n.

The advantage of a liquid stabilizer is the fact that metering of liquids is easier than metering of solids. This means that the finished stabilizer has to have a particular viscosity.

Radicals (II) suitable for achieving easy incorporation are those which result in the condensation product of (I) and (II) having a viscosity at room temperature (25° C.) of $\eta=10^{-2}-10^{2}$ Pas, but preferably $\eta=10^{-1}-10^{1}$ Pas.

A PTHF stabilized according to the invention preferably comprises the stabilizers (b) in an amount of from 1 ppm to 5000 ppm, preferably from 10 ppm to 1000 ppm, particularly preferably from 50 ppm to 750 ppm, in particular from 50 to 500 ppm, in each case based on the total weight of the mixture (1) comprising PTHF and stabilizers. In addition to the stabilizers used according to the invention, further generally known stabilizers, for example phosphites, thio synergists, HALS compounds, UV-absorbers, quenchers, and sterically hindered phenols, can be used in the mixtures.

The polytetrahydrofuran (a) stabilized according to the invention preferably has a molecular weight of from 200 g/mol to 10000 g/mol, particularly preferably from 200 g/mol to 5000 g/mol.

The mixture comprising (a) and (b) preferably has a Haze and color number of <100 measured in accordance with DIN 53409. This low color number is preferably obtainable by means of a stabilizer (b) which is obtainable by means of an esterification reaction, preferably of the connecting radical (II) with the active group (I), in the presence of reducing agents, preferably phosphite.

EXAMPLES

Example 1

Preparation of a Stabilizer According to the Invention 110 g of polytetrahydrofuran (PTHF 250) (molecular weight: 226.85 g/mol; 0.4849 mol) together with 277.9 g of methyl 3-(3,5-di-tert-butyl-4-hydroxyphenyl)propionate (molecular weight: 292.4 g/mol; 0.9504 mol) and 1000 ppm of potassium methoxide were placed in a 500-ml-flask. The solution was purged with nitrogen and then heated to 140° C. while stirring. Nitrogen was passed through the solution throughout the reaction. The methanol formed was frozen out in a cold trap (liquid nitrogen). After 7 hours, the reaction was stopped. Analysis by GPC indicated complete conversion of the methyl 3-(3,5-di-tert-butyl-4-hydroxyphenyl)propionate. To remove the potassium methoxide, phosphoric acid (85% of the stoichichometric amount of potassium methoxide) was added at 80 C. After stirring for 30 minutes, 3% by weight of water was added at 80° C. at a stirring time of 2 hours. The excess water was subsequently removed by distillation and the salt which had precipitated was filtered off.

Example 2

Preparation of a Stabiliser According to the Invention 25 g of a polyethylene glycol (Pluriol® E 200, BASF Aktiengesellschaft) (OHZ 557 mg KOH/g) and 71.13 g of methyl 3-(3,5-di-tert-butyl-4-hydroxyphenyl)propionate. (Firma Raschig) were weighed into a four-neck flask and heated to 145° C. During the heating-up phase and the transesterification reaction, a stream of nitrogen was continuously passed through the solution. After the temperature of 145° C. had been reached 0.177 g=2000 ppm of potassium methoxide was added to the solution to start the actual transesterification reaction. The methanol formed was frozen out in a down stream cold trap (liquid nitrogen). After a reaction, of 6 hours, the product was cooled to 80° C. 0.246 g of 85% strength phosphoric acid was subsequently introduced into the flask to naturalize the product. The product was stirred further for half an hour at 80° C. and subsequently filtered through a pressure filter from SeitzSchenk fitted with a filter type T750 (Retention: 4-10 µm). The conversion in the esterification reaction determined by gel permutation chromatography was above 95% in all examples. The potassium content was determined by means of atomic absorption spectroscopy and was below 20 ppm of potassium for all experiments.

Example 3

Preparation of a Stabilizer According to the Invention 155 g of a trifunctional polyetherol (BASF Aktiengesellschaft) and 200 g of methyl 3-(3,5-di-tert-butyl-4-hydroxyphenyl)propionate were introduced into a 500-ml-flask. The mixture was heated to 100° C. while purging with nitrogen. 35 mg of titanium tetrabutoxide were then added. While stirring and continuing to purge with nitrogen, the mixture was heated to 165° C. and a slight vacuum was applied. After 2 hours at 165° C., the mixture was heated to 170° C. and after another 2 hours to 175° C. After a further 4 hours, the reaction was stopped.

Example 4

Preparation of a Stabilizer According to the Invention 122.6 g of methyl 3-(3,5-di-tert-butyl 4 hydroxyphenyl) propionate (420 mmol), 48.3 g of polyetheramine D 230 (BASF Aktiengesellschaft), 2 g of p-toluolsulfonic acid (10 mmol), and 0.5 g of 50% strength hypo phosphorus acid were introduced into a 500-ml-flask and heated to 180° C. The methanol formed was separated off via a distillation attachment. The conversion was determined via the amine number, and after 4 hours the conversion was 91%. The product was light-yellow, vitreous and clear.

Example 5

The volatility of the stabilizer from example 2 was examined by means of thermogravimetry. For this purpose, the stabilizer was heated under nitrogen from room temperature to 350° C. at a heating rate of 20 K/min. For comparison, the phenolic stabilizers BHT and methyl 3-(3,5-di-tert-butyl-4-hydroxyphenyl)propionate were tested under the same conditions. As can be seen from table 1, the volatility of the stabilizer according to the invention is significantly lower than that of the comparative products.

TABLE 1

| Stabilizer | Onset Temperature of Weight Loss in ° C. |
| --- | --- |
| BHT | 160° C. |
| Methyl 3-(3,5-di-tert-butyl-4-hydroxyphenyl)propionate | 188° C. |
| Stabilizer from example 2 | 347° C. |

Example 6

PTHF 1000 (BASF Aktiengesellschaft) was stabilized with stabilizer from example 2, and the oxidation induction time (OIT) was determined by means of DSC. For comparison, the sample was stabilized with Irganox® 1076 (Ciba Spezialitatenchemie Lampertheim GmbH).

Table 2 shows that the stabilizer from example 2 has a better stabilizing action at the same concentration.

TABLE 2

| Stabilizer | Concentration | OIT |
| --- | --- | --- |
| — | — | 172° C. |
| Example 2 | 500 ppm | 196° C. |
| Irganox ® 1076 | 500 ppm | 201° C. |

We claim:

1. A mixture comprising (a) polytetrahydrofuran and (b) and at least one stabilizer comprising at least two phenolic groups which are joined to one another by a polyol having a number average molecular weight of from around 500×F g/mol to 1000×F g/mol, wherein F is the number of the phenolic groups in the molecule.

2. The mixture according to claim 1, wherein the number average molecular weight (Mn) of the polyol is less than its weight average molecular weight (Mw).

3. A mixture (1) comprising (a) polytetrahydrofuran and at least one stabilizer (b), wherein the stabilizer (b) comprises at least one molecule selected from the group consisting of formula (X), formula (XX), and mixtures thereof,

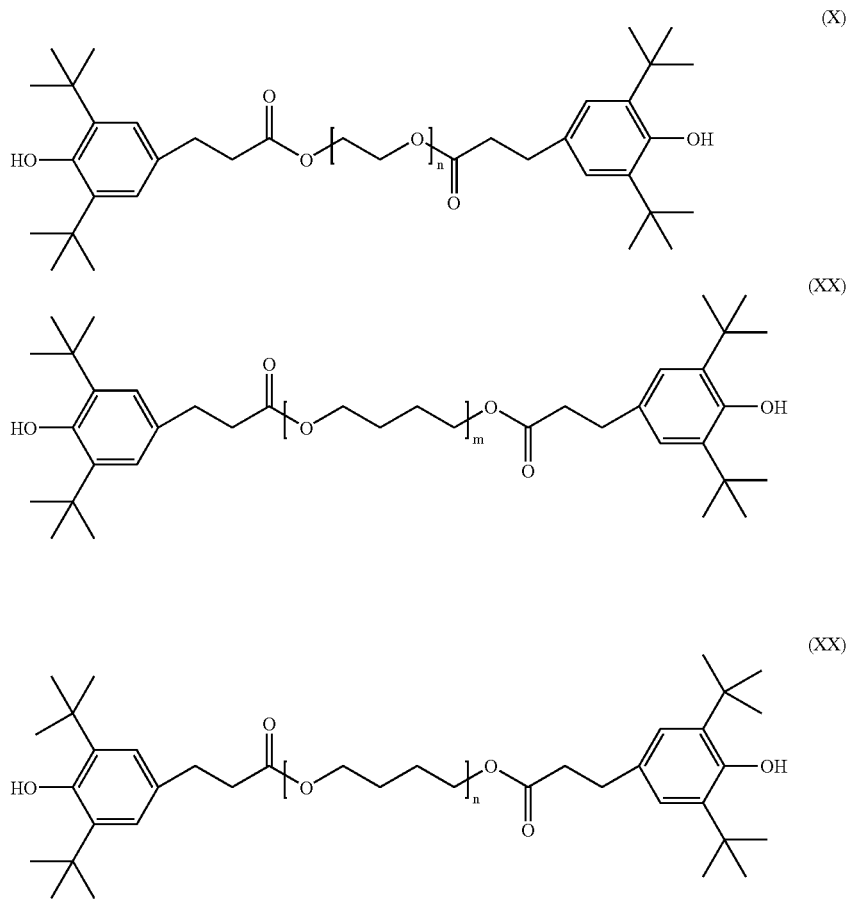

wherein n is 11, 12, 13, 14, 15, 16, 17, 18, 19, 20, 21, 22, 23, 24, 25, 26, 27, 28, 29, 30 or 31, and wherein m is an integer and ranges from 7 to 31.

4. The mixture according to claim 1, wherein the at least one stabilizer (b) is comprised in an amount of from 1 ppm to 5000 ppm, based on the total weight of the mixture.

5. The mixture according to claim 1, wherein the polytetrahydrofuran (a) has a molecular weight of from 200 g/mol to 10000 g/mol.

6. A process for producing a polyurethane, comprising reacting the mixture of claim 1 with at least one isocyanate to form the polyurethane.

7. The mixture of claim 3, wherein the at least one stabilizer (b) comprises at least one molecule of formula (X).

8. The mixture of claim 3, wherein the at least one stabilizer (b) comprises at least one molecule of formula (XX).

9. The mixture of claim 3, wherein the at least one stabilizer (b) comprises at least one molecule of formula (X) and at least one molecule of formula (XX).

10. The mixture of claim 1, wherein the polyol has a number average molecular weight of 500×F g/mol, wherein F is the number of phenolic groups in the molecule.

* * * * *